July 2, 1940.  H. BOEGEHOLD  2,206,155
MICROSCOPE OBJECTIVE
Filed Oct. 10, 1938
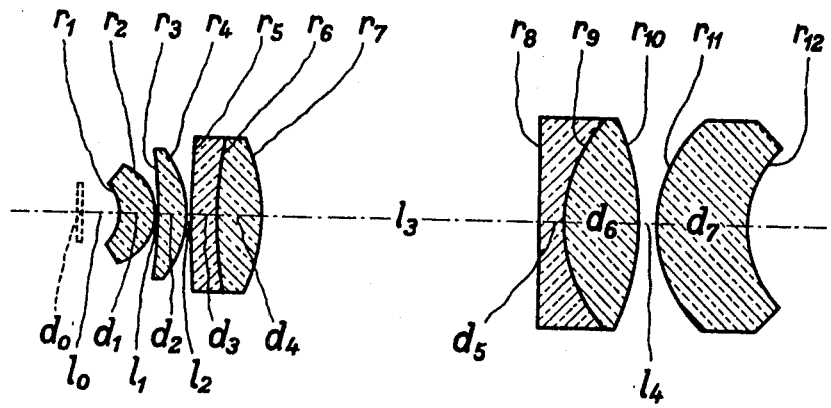
|  |  |  | $n_d$ | $\nu$ |
|---|---|---|---|---|
|  | $d_0 = 0.17$ |  | 1.5220 | 58.7 |
| $r_1 = -1.86$ |  | $l_0 = 1.45$ |  |  |
| $r_2 = -2.11$ | $d_1 = 1.5$ |  | 1.5264 | 60.1 |
| $r_3 = -17.6$ |  | $l_1 = 0.05$ |  |  |
| $r_4 = -4.0$ | $d_2 = 1.1$ |  | 1.5163 | 64.0 |
| $r_5 = +695.0$ |  | $l_2 = 0.2$ |  |  |
| $r_6 = +16.3$ | $d_3 = 1.05$ |  | 1.7174 | 29.5 |
| $r_7 = -7.2$ | $d_4 = 1.8$ |  | 1.4645 | 65.7 |
| $r_8 = -40.0$ |  | $l_3 = 10.9$ |  |  |
| $r_9 = +5.9$ | $d_5 = 1.0$ |  | 1.6477 | 33.9 |
| $r_{10} = -9.7$ | $d_6 = 3.0$ |  | 1.5160 | 56.8 |
| $r_{11} = +5.4$ |  | $l_4 = 0.7$ |  |  |
| $r_{12} = +4.3$ | $d_7 = 3.6$ |  | 1.5163 | 64.0 |
*Inventor:*
*Hans Boegehold.*

Patented July 2, 1940

2,206,155

UNITED STATES PATENT OFFICE 2,206,155

MICROSCOPE OBJECTIVE

Hans Boegehold, Jena, Germany, assignor to the firm of Carl Zeiss, Jena, Germany Application October 10, 1938, Serial No. 234,287
In Germany October 13, 1937

4 Claims. (Cl. 88—57)

The present invention concerns microscope objectives and aims at reducing the image field curvature in objectives of medial and great magnifications without entailing a disturbing astigmatism. To this effect, the invention makes use of thick menisci, viz., menisci the medial thickness of which is greater than half the radius of curvature of the dispersing end surface, the radius of curvature of the dispersing end surface being in these menisci smaller than that of the convergent end surface. In spite of this condition concerning the refractive power of the end surfaces, a meniscus of this kind need not have a negative refractive power, this power being zero at a definite thickness and positive at a still greater thickness. A meniscus of this kind has been used already in weak microscope objectives, in which it is the last member. A thick meniscus positioned at this place is not, however, sufficient when medial and strong magnifications are concerned, because the radii of curvature would have to be smaller than admissible at the said place owing to the diameter of the imaging pencil. According to the invention, the desired aim can be, however, arrived at if the front member of the microscope objective is constructed as a meniscus of this kind, and if another meniscus of this kind is added at a place corresponding to that in the above-mentioned objectives of slight magnification. This other meniscus need not, however, assume the last place, but between this other meniscus and the first are to be at least three members of positive refractive power separated from each other by air, so that this other meniscus is at a place at which the imaging pencil is only slightly inclined to the axis. If the meniscus is a single lens having a front radius of curvature $r_1$ and a rear radius of curvature $r_2$, the condition that the radius of curvature of the dispersing end surface is to be smaller than that of the convergent end surface is fulfilled when $$r_2 < r_1$$

that is to say when $$1/r_1 - 1/r_2 < 0$$

If the lens has the refractive index $n$, and as always $$(n-1) > 0$$

it follows that $$(n-1)(1/r_1 - 1/r_2) < 0$$

and, accordingly, that $$(n-1)/r_1 + (1-n)/r_2 < 0$$

This means that the algebraic sum of the refractive powers of the two surfaces is negative in air. This condition is to be observed also as regards menisci consisting of a plurality of cemented lenses, the algebraic sum of all the refractive powers in these menisci having to be, accordingly, negative in air (also in air in the case of the frontmost surface of an immersion objective). For $k$ surfaces there is to hold good, accordingly:

$$(n_1-1)/r_1 + (n_2-n_1)/r_2 + (n_3-n_2)/r_3 + \cdots (1-n_{k-1})/r_k < 0$$

The algebraic value of the refractive power in air is in each of the two menisci conveniently greater than one third of the algebraic sum referred to above. As this sum itself has to be always negative, the meniscus may have either a positive refractive power, or the refractive power zero, or a certain negative refractive power of restricted numerical value.

It is also useful if the radius of curvature of the dispersing end surface is in the front meniscus smaller than the focal distance of the objective and in the rear meniscus smaller than twice the focal distance of the objective.

It has proved to be convenient for an especially great approximation to the desired aim if the dispersing surface of the front meniscus is directed to the exterior and the rear meniscus assumes a position reverse to that of the front meniscus.

The effect of the menisci described above in detail is due to a reduction of the Petzval sum $$\left(\sum \frac{1}{f_n}\right)$$

In the objective according to the invention, this sum can be reduced so much as to be smaller than in a thin crown glass of the same focal length.

If in an immersion objective the dispersive surface of the front meniscus is directed outwardly, it may be convenient to fill up the consequent cavity by means of a lens whose end surface remote from the meniscus is likewise concave but curved less than the front surface of the meniscus, or which is plane or convex, the exponent of refraction of this lens corresponding approximately to that of the immersion material. A lens of this kind does not produce any or produces only a slight optical effect, but offers for instance the advantage that it can be cleaned more easily than the front surface of the meniscus. A lens of this kind does not, of course, constitute an optical part of the objective.

The accompanying drawing illustrates in axial section an example of the invention. The following table indicates the decisive values for a focal distance of 5.04 millimetres and a numerical aperture of 0.65. The cover glass having the thickness $d_0$, for which the objective is corrected, is also shown in the drawing.

| | | | $n_d$ | $\nu$ |
|---|---|---|---|---|
| | $d_0=0.17$ | | 1.5220 | 58.7 |
| | | $l_0=1.45$ | | |
| $r_1=-1.86$ | $d_1=1.5$ | | 1.5264 | 60.1 |
| $r_2=-2.11$ | | $l_1=0.05$ | | |
| $r_3=-17.6$ | $d_2=1.1$ | | 1.5163 | 64.0 |
| $r_4=-4.0$ | | $l_2=0.2$ | | |
| $r_5=+695.0$ | $d_3=1.05$ | | 1.7174 | 29.5 |
| $r_6=+16.3$ | $d_4=1.8$ | | 1.4645 | 65.7 |
| $r_7=-7.2$ | | $l_3=10.9$ | | |
| $r_8=-40.0$ | $d_5=1.0$ | | 1.6477 | 33.9 |
| $r_9=+5.9$ | $d_6=3.0$ | | 1.5160 | 56.8 |
| $r_{10}=-9.7$ | | $l_4=0.7$ | | |
| $r_{11}=+5.4$ | $d_7=3.6$ | | 1.5163 | 64.0 |
| $r_{12}=+4.3$ | | | | |

In this objective, the Petzval sum amounts to 0.08142. In a thin crown glass lens of the same focal length this sum would be 0.13089.

I claim:

1. A microscope objective comprising a plurality of convergent lenses axially spaced by air, a meniscus lens in front of said convergent lenses, and another meniscus lens separated from first said meniscus lens by at least three of said convergent lenses, the central thickness of each of said two meniscus lenses being greater than half the radius of curvature of the corresponding dispersive end surface, said radius of curvature being smaller than that of the convergent end surface, and the algebraic sum of the refractive powers of all surfaces in these menisci being negative.

2. In a microscope objective according to claim 1, the algebraic value of the refractive power of each of said meniscus lenses being greater than one third of the algebraic sum of the refractive powers of all their surfaces.

3. In a microscope objective according to claim 1, the numerical value of the radius of curvature of the dispersive end surface of said front meniscus lens being smaller than the focal length of the objective, and the numerical value of the radius of curvature of the dispersive end surface of the rear meniscus being smaller than twice the focal length of the objective.

4. A microscope objective comprising a plurality of convergent lenses axially spaced by air, a meniscus lens in front of said convergent lenses, the convergent end surface of said meniscus lens facing said lenses, and another meniscus lens separated from first said meniscus lens by at least three of said convergent lenses, the convergent end surface of said other meniscus facing said convergent lenses, the central thickness of each of said two meniscus lenses being greater than half the radius of curvature of the corresponding dispersive end surface, said radius of curvature being smaller than that of the convergent end surface, and the algebraic sum of the refractive powers of all surfaces in there menisci being negative.

HANS BOEGEHOLD.